July 30, 1940.  R. M. ULRICH  2,209,432

PISTON EXPANDER

Filed Nov. 5, 1935

Inventor:
Raymond M. Ulrich,
by Alois W. Graf
Attorney.

Patented July 30, 1940

2,209,432

UNITED STATES PATENT OFFICE 2,209,432

PISTON EXPANDER

Raymond M. Ulrich, Shelbyville, Ill., assignor to Alois W. Graf, Strasburg, Ill.

Application November 5, 1935, Serial No. 48,312

18 Claims. (Cl. 309—12)

My invention relates to piston expanders of the type which is readily installed in any of the pistons in common use.

Heretofore numerous piston expanders and expansible pistons have been proposed. Such devices, however, have often been characterized by a complex structure which necessitated special machining on the piston and special tools for the installation of such devices.

It, therefore, is an object of my invention to provide an improved piston expander which will overcome many of the disadvantages inherent in the devices of the prior art and which will be simple and reliable in operation.

It is a further object of my invention to provide an improved piston expander which can be installed in pistons without the use of special tools other than those usually found in automotive repair shops.

In accordance with my invention I provide an arcuate or curved spring member having a projection near each end of the member and a projection at an intermediate portion thereof which projections are adapted to engage indentations on the faces of the slots of the piston skirt. As many of the pistons in common use are provided with a slot it is only necessary to form the indentations on the faces of the slot by means of an ordinary drill, and to space the indentations in accordance with the distances between the projections on the expander which forms a part of my invention.

Figure 5:
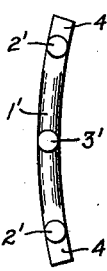
Figure 6:

The novel features which I believe to be characteristic of my invention are set forth with particularity in the appended claims. My invention itself, however, both as to its organization and method of operation, together with further objects and advantages thereof, will be understood better by reference to the following description taken in connection with the accompanying drawing in which Figs. 1 and 2 show a preferred embodiment of my invention, Figs. 3 and 4 show, respectively, exterior and interior views of a piston skirt provided with my expander, while Figs. 5 and 6 disclose other forms of my invention.

Figure 1:
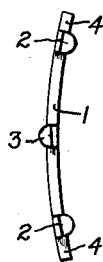
Figure 2:

Referring to Figs. 1 and 2 of the drawing, I have illustrated therein a preferred embodiment of my piston expander comprising an arcuate shaped body member 1 preferably of flat spring steel, provided with a plurality of lugs or projections 2 in the proximities of ends of the body 1 and a projection 3 at an intermediate portion thereof. The projections 2 near the ends of the body 1 are set back from the extremities thereof so as to leave a flat portion 4, the purpose of which will subsequently become apparent. The projecting members 2 and 3 are arranged substantially perpendicular to the plane of the arc of the resilient curved body portion of the expander, but preferably at a slight angle to the perpendicular of the plane so that the curved outer surfaces of the projections 2 and 3 form slight angles to the right and left of the line perpendicular to the plane of the arc of the body 1.

Figure 3:
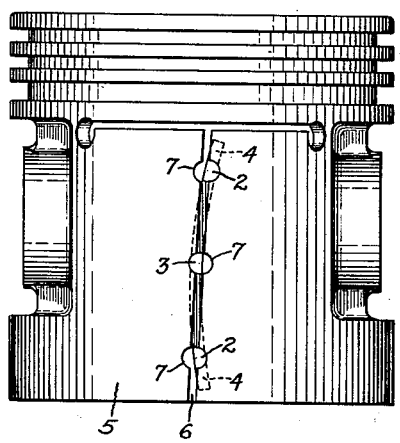

Reference may now be had to Fig. 3 wherein I have disclosed a piston provided with an expansible skirt 5 having a slot 6 therein. In order to prepare the piston slot 6 for the insertion of the expander therein it is only necessary to utilize a drill having a diameter equal to the diameter of the semi-circular projecting members 2 and 3. At distances corresponding to the distances between the centers of the projecting members 2 and 3 the drill is utilized to form the arcuate indentations 7 on the opposite faces of the slot 6 of the piston skirt. The piston is now ready to receive the expander. To insert the expander it is only necessary to grasp the expander at one end with a pair of pliers and it will be found that the upper projections 2 and 3 will readily fit into the indentations on the faces of the piston slot. Having engaged the upper two indentations a slight pressure on the pliers tending to straighten the expander or lessen the curvature of the arc will cause the remaining projection 2 to engage the lower indentations 7 of the piston slot 6.

Figure 4:
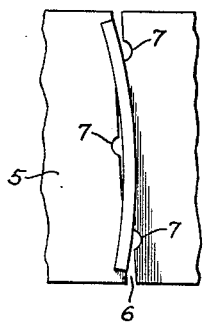

It will be noted from Figs. 3 and 4 that the expander fits closely to the inside wall of the piston skirt 5 so that the flat end portions 4 of the unitary curved spring expander engage the inside wall of the piston skirt thereby preventing any possible change in the shape of the expander, due to temperature variations which would tend to cause the end projection 2 to extend through the wall of the piston an undue amount. The flat portion 4 of the expander body 1 therefore operates as an additional supporting surface for the expander contiguous to the inside wall of the piston skirt.

Due to the simplicity of the expander it will be found that the expander is adaptable to all types of pistons, regardless of the inside shape of the piston, with reference to strengthening struts and ribs. Because of the fact that no special tools are necessary for the insertion of my expander it will be found that it is unnecessary to make the projections 2 and 3 so long as to permit a special tool to grasp the expander for insertion thereby necessitating subsequently the removal of the excess length of these projecting members. As the expanders of the spring type are generally made of tempered steel it is undesirable to have to remove a considerable length of these projecting members by grinding inasmuch as it often happens that these extremities become overheated thereby tending to change the temper of the expander. Therefore, in accordance with my invention it will be found that the projecting members 2 and 3 need only be made of sufficient height so as to extend through from the inside to the outside of the piston skirt of the average piston on the market. If a piston is encountered having a skirt somewhat thinner than the usual piston it will be found that it will be necessary to remove only a slight portion of the members 2 and 3 so as to cause the piston expander to conform to the thickness of the skirt.

Although the projecting members 2 and 3 of the piston expander are substantially perpendicular to the plane of the curve of the expander, the outer edges of these members which bear against the indentations in the piston slots are at a slight angle to the perpendicular so that the resultant angle between the outer surfaces of the members 2 and 3 is appreciable. This angle between the outer surfaces of the members 2 and 3 operates to cause the piston expander to exert a greater tension upon a thick walled piston than upon a thin walled piston since in a thick walled piston the projecting members 2 and 3 are of greater length. In other words, the distance between an arc tangential to the upper extremity of the projection 2 and an arc tangential to the upper extremity of the projection 3 becomes greater as the piston wall increases in thickness. It is also believed to be apparent that these extremities not only serve to draw the expander body against the piston skirt and to maintain the piston expander in position, but also operate to exert a greater pressure upon the piston skirt of a thick walled piston than upon a thin walled piston.

While the embodiment illustrated in Figs. 1 and 2 shows that the body of the expander is of a material having a substantially rectangular cross section, it will be apparent to those skilled in the art that other cross sectional forms could be utilized. Accordingly in Figs. 5 and 6 I have shown a modification of my expander wherein the body 1' is of material having a circular cross section. It will be noted that the body has an arcuate shape in one plane and that the projecting members 2' and 3' which are circular in form are substantially perpendicular to the plane of the arc. It furthermore will be noted that the extremities of the body 1 have been forged or shaped so as to provide the flat surfaces 4' at the ends of the body thereby providing a supporting surface for the expander against the inside surface of the piston.

While I have shown and described my invention in connection with certain specific embodiments, it will, of course, be understood that I do not wish to be limited thereto, since it is apparent that modifications may be made in the instrumentalities employed without departing from the spirit and scope of my invention as set forth in the appended claims.

What I claim as new and desire to secure by Letters Patent of the United States is:

1. A piston expander comprising an arcuate shaped spring member having a projection near each end of said member and a projection at an intermediate portion thereof, all of said projections being arranged substantially perpendicular to the plane of the arc of said member.

2. A piston expander comprising an arcuate shaped spring body member provided with a plurality of projections thereon substantially perpendicular to the plane of the arc of said member, one of said projections being located at an intermediate point on said member, and a projection located back from each extremity of said member a distance sufficient to provide a supporting surface on said member adjacent to the ends thereof.

3. A piston expander comprising an arcuate shaped spring body member provided with a plurality of projections arranged in planes at slight angles to a perpendicular to the plane of the arc of said body member, one of said projections being located at an intermediate portion of said body, and a projection located in the proximity of each end of said body at a sufficient distance from the extremity thereof to provide a supporting surface at each end of said body member.

4. The combination with a piston having a slotted expansible skirt, of a unitary arcuate shaped spring expansion member provided with a plurality of projections arranged at slight angles to a perpendicular to the plane of the arc of said expansion member, said projections engaging the sides of the slot in said skirt thereby to effect an increase in the circumference of said skirt.

5. The combination of a piston skirt having a slot therein, a plurality of indentations in each of the faces of said slot, an expander cooperating with said slot and being located on the inside of said piston skirt, said expander comprising a spring body member provided with a plurality of members projecting into said slot, said members having convex bearing surfaces a portion of said projecting members engaging some of the indentations on one side of said slot, and the remaining member engaging the indentation on the other side of said slot.

6. The combination of a piston skirt having a slot therein, a plurality of indentations in the faces of said slot, an expander located on the inside of said skirt in the proximity of said slot, said expander comprising a spring member having a projection near each extremity of said member and a projection at an intermediate portion thereof, said end projections extending into said slot and engaging the indentations on one face of said slot and said intermediate projection engaging the indentation in the other face of said slot.

7. The combination of a piston skirt having a slot therein, a plurality of arcuate indentations in the faces of said slot, an expander located on the inside of said piston skirt for cooperation with said slot, said expander comprising a spring body provided with a plurality of members projecting into said slot, some of said projecting members enegaging said arcuate indentations on one face of said slot and at least one of said projecting members engaging an indentation on the other face of said slot, said projections having contours conforming to the indentations engaged.

8. A piston expander for expansible piston skirts having a slot therein comprising a curved spring body member provided with a projection near each end of said member and at least one projection at an intermediate portion thereof for engaging said piston skirt slot, said projections each being arranged at a slight angle to a perpendicular to the plane of the curve of said body member, each projection being arranged at a slight angle to the perpendicular in a direction substantially opposite to the inclination of the adjacent projection whereby the resultant angle between said projections serves to cause said body member to exert an increased expanding effect as the thickness of said piston skirt is increased.

9. A piston expander for expansible piston skirts having a slot therein comprising a curved spring body having a projecting member near each end of said body and a projecting member at an intermediate portion thereof for engaging said piston skirt slot, each of said projecting members being arranged at an acute angle to a perpendicular to the plane of the curve of said body, certain of said projecting members having an inclination toward one side of said body and the remaining projecting members having an inclination toward the opposite side of said body.

10. A piston expander for expansible piston skirts having a slot therein comprising a curved spring body having a projecting member near each end of said body and a projecting member at an intermediate portion thereof for engaging said piston skirt slot, each of said projecting members being arranged at an acute angle to a perpendicular to the plane of the curve of said body, said end projecting members having an inclination toward one side of said body and said intermediate projecting member having an inclination toward the opposite side of said body, the resultant angles between said projecting members operating to cause the body of said expander to be drawn against said skirt when said expander is in engagement with the slot of a piston skirt.

11. The combination with a piston having in the expansible skirt thereof a slot provided with arcuate indentations on each side of said slot, a unitary spring expansion member located within said skirt and being provided with a plurality of projections engaging indentations on opposite sides of said slot, said projections each having an arcuate surface substantially complementary in shape to said arcuate indentations of said piston slot.

12. The combination with a piston having a skirt provided with a slot having arcuate indentations therein, of a unitary curved expansion member provided with a projection near each end thereof, each projection having an arcuate surface and being arranged at a slight angle to a perpendicular to the plane of said member, said arcuate surfaces of said projections engaging said indentations of said slot in said skirt, and intermediate portions of said member being in contact with said piston skirt.

13. A piston expander comprising a resilient curved body portion, a transversely disposed lug adjacent each end of said body, each of said lugs having a convex surface complementary to the concave surface of a circular orifice formed through the skirt of a piston, said lugs being adapted to be fitted into said orifices with the intermediate portions of said body in contacting relation with the inside of said skirt.

14. A piston-skirt expander for use with a trunk type piston having a skirt slotted generally longitudinally and having a transverse slot communicating with the inner end of said longitudinal slot (that is, the end nearest the head-end of the piston), said piston-skirt expander comprising an elongated and bowed resilient spring member adapted to be disposed adjacent to the inner surface of the piston skirt but with the major portion thereof disposed radially inwardly and clear of the inner cylindrical surface of the piston-skirt and with the curvature of said elongated bowed spring member lying substantially in a plane parallel to the plane tangent to the skirt at the longitudinal slot thereof, said elongated bowed resilient spring member having at least three skirt-contacting elements adapted to extend into said longitudinal slot of the piston-skirt and spaced from each other in the direction of the longitudinal extent of said spring member, for oppositely engaging the opposed sides of said longitudinal slot in staggered relation and for exerting opposed tangential forces upon the two opposed sides of the piston-skirt on either side of said longitudinal slot.

15. The combination with a piston having a slotted expansible skirt, of a unitary arcuate shaped spring expansion member located on the inside wall of said skirt and being provided with three projections, two of which engage one side of the slot in said skirt, the other of which engages the other side of said slot thereby expanding said piston skirt.

16. A piston expander comprising a body member of flat spring steel, said body member being provided with a projection near each end thereof and a projection at an intermediate portion thereof, said projections each being arranged at a slight angle to the plane of said body member, said end projections being arranged to have an inclination substantially opposite to the inclination of said intermediate projection.

17. The combination with a piston skirt having a longitudinal slot therein comprising an expander having an elongated body member of resilient material located on the inside wall of said piston skirt in the proximity of said slot, said body member being provided with three spaced-apart projections for engaging the faces of said piston slot, said projections each being arranged at a slight angle to the plane of said body member and in a direction substantially opposite to the inclination of the adjacent projection.

18. A piston expander comprising a body member of resilient material adapted to be located within the inner diameter of a piston skirt and provided with a lug adjacent each of its free ends and a lug at an intermediate point thereon, said lugs being adapted to engage the slot of a piston skirt and the outer surfaces of said lugs being convex in shape.

RAYMOND M. ULRICH.